(12) United States Patent
Yamamoto et al.

(10) Patent No.: US 7,776,982 B2
(45) Date of Patent: Aug. 17, 2010

(54) SILICON-CONTAINING FLUOROCHEMICAL SURFACE-TREATING AGENT

(75) Inventors: Ikuo Yamamoto, Settsu (JP); Tetsuya Masutani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 449 days.

(21) Appl. No.: 10/559,765

(22) PCT Filed: Jun. 7, 2004

(86) PCT No.: PCT/JP2004/008245
§ 371 (c)(1),
(2), (4) Date: Dec. 7, 2005

(87) PCT Pub. No.: WO2004/108855
PCT Pub. Date: Dec. 16, 2004

(65) Prior Publication Data
US 2006/0134439 A1    Jun. 22, 2006

(30) Foreign Application Priority Data
Jun. 9, 2003    (JP) .............................. 2003-163460
Dec. 5, 2003    (JP) .............................. 2003-407439

(51) Int. Cl.
*C08F 30/08* (2006.01)
(52) U.S. Cl. ..................... 526/279; 526/319; 525/479
(58) Field of Classification Search ................ 526/279, 526/319; 525/479
See application file for complete search history.

(56) References Cited

U.S. PATENT DOCUMENTS 5,021,501 A * 6/1991 Ohmori et al. ............... 524/544
5,128,389 A * 7/1992 Inukai et al. ................. 522/172

FOREIGN PATENT DOCUMENTS

| EP | 0 247 489 A2 | 12/1987 |
| EP | 0 327 906 A1 | 8/1989 |
| EP | 0 333 083 A2 | 9/1989 |
| EP | 1 640 387 A1 | 3/2006 |
| JP | 58-42682 A | 3/1983 |
| JP | 63-75082 A | 4/1988 |
| JP | 63-90588 A | 4/1988 |
| JP | 63-99285 A | 4/1988 |
| JP | 63-101472 A | 5/1988 |
| JP | 1-315471 A | 12/1989 |
| JP | 7-109317 | 4/1995 |
| JP | 9-324173 | 12/1997 |
| WO | WO 97/11218 | 3/1997 |
| WO | WO 02/40603 | 5/2002 |

OTHER PUBLICATIONS

"Preliminary Risk Assessment of the Developmental Toxicity Associated With Exposure to Perfluorooctanoic Acid and Its Salts", U.S. Environmental Protection Agency Office of Pollution Prevention and Toxics Risk Assessment Division, http://www.epa.gov/opptintr/pfoa/pfoara.pdf, Apr. 10, 2003, pp. 1-61.

U.S. Environmental Protection Agency,"Perfluorooctanoic Acid (PFOA), Fluorinated Telomers; Request for Comment, Solicitation of Interested Parties for Enforceable Consent Agreement Development, and Notice of Public Meeting", Federal Register, vol. 68, No. 73, Wednesday, Apr. 16, 2003/Notices, pp. 18626-18633, [FRL-7303-8], http://www.epa.gov/opptintr/pfoa/pfoafr.pdf.

U.S. Environmental Protection Agency, "EPA Intensifies Scientific Investigation of a Chemical Processing Aid", EPA Environmental News, Monday Apr. 2003, pp. 1-2, http://www.epa.gov/opptintr/proa/pfoaprs.pdf.

U.S. Environmental Protection Agency, "EPA OPPT Fact Sheet", Apr. 14, 2003, 3 pages, http://ww.epa.gov/opptintr/pfoa/pfoafacts.pdf.

* cited by examiner

*Primary Examiner*—Kuo-Liang Peng
(74) *Attorney, Agent, or Firm*—Sughrue Mion, PLLC

(57) ABSTRACT

There is provided a surface treatment agent which comprises a fluoropolymer having repeating units derived from a fluorine-containing monomer of the formula:

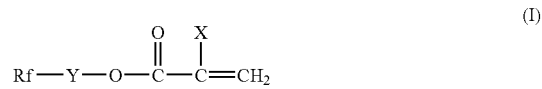

(I)

wherein (a) the fluoropolymer contains a silicon atom, and/or (b) the surface treatment agent contains a fluorine-free polymer which is different from the fluoropolymer and which is a silicon-containing polymer. The surface treatment agent imparts excellent water- and oil-repellency and soil resistance to textiles while retaining the feeling of the textiles, even if the surface treatment agent contains a fluorine-containing acrylate polymer substituted at its α-position by a fluorine atom, a chlorine atom or the like.

7 Claims, No Drawings

SILICON-CONTAINING FLUOROCHEMICAL SURFACE-TREATING AGENT

TECHNICAL FIELD

The present invention relates to a surface-treating agent for imparting excellent water repellency, oil repellency, soil resistance and feeling to textiles, and a treatment using the same.

BACKGROUND ART

It is commonly known that a fluorine-containing acrylate polymer substituted at its α-position by a fluorine atom, chlorine atom or the like has excellent properties such as sufficient adhesive property to a base material, a property of forming a tough film, good water and oil repellency, etc. (cf. JP-A-63-90588, JP-A-63-99285 and JP-A-1-315471). However, a coating film of this polymer is tough and thus impairs the feeling of a textile when used for treating the textile.

Described below are the environmental problems raised by perfluorooctanoic acid (PFOA). The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), one of long chain fluoroalkyl compounds, is proved to have a danger to burden the environment. Under such a situation, EPA announced on Apr. 14, 2003 that the scientific investigation on PFOA should be more intensively executed.

On the other hand, the Federal Register (FR Vol. 68, No. 73/ Apr. 16, 2003 [FRL-2303-8], http://www.epa.gov/opptintr/pfoa/pfoafr.pdf), EPA Environmental News FOR RELEASE: MONDAY APR. 14, 2003 EPA INTENSIFIES SCIENTIFIC INVESTIGATION OF A CHEMICAL PROCESSING AID (http://www.epa.gov/opptintr/pfoa/pfoaprs.pdf) and EPA OPPT FACT SHEET Apr. 14, 2003 (http://www.epa.gov/opptintr/pfoa/pfoafacts.pdf) have published that telomers have a possibility to produce PFOA when decomposed or metabolized (herein, the telomer means a long chain fuluoroalkyl group), and also that telomers have been widely used in foam fire extinguishers, care products, washing materials, carpets, textiles, paper, leather, etc., in order to impart water and oil repellency and soil resistance to them.

DISCLOSURE OF THE INVENTION

An object of the present invention is therefore to impart excellent water and oil repellency, and soil resistance to textiles while keeping the feeling of the textiles, even though the textiles are treated with a fluorine-containing acrylate polymer substituted at its α-position by a fluorine atom, chlorine atom or the like.

The present inventors have discovered that the above object can be attained by using a surface treatment agent comprising a copolymer of a fluorine-containing monomer and a silicon-containing monomer, or a surface treatment agent comprising a fluoropolymer and a silicon-containing polymer The present invention provides a surface treatment agent comprising a fluoropolymer which has repeating units derived from a fluorine-containing monomer of the formula:

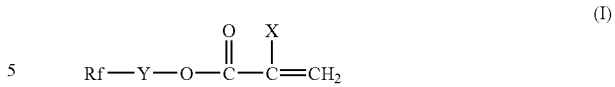

wherein X is a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched fluoroalkyl or fluroalkenyl group having 1 to 21 carbon atoms, or a fluoroether group having totally 1 to 200 repeating units selected from the group consisting of the repeating units: —$C_3F_6O$—, —$C_2F_4O$— and —$CF_2O$—, and wherein (a) the fluoropolymer contains a silicon atom, and/or (b) the surface treatment agent comprises the fluoropolymer (a first polymer) and a second polymer different from the first polymer, said second polymer being a silicon-containing polymer which contains a silicon atom.

According to the present invention, excellent water and oil repellency and soil resistance can be imparted to a textile while retaining the feeling of the textile, even though the textile is treated with a fluorine-containing acrylate polymer substituted at its α-position by a fluorine atom, chlorine atom or the like.

In the present invention, (a) the fluoropolymer contains a silicon atom, and/or (b) the surface treatment agent comprises the fluoropolymer (that is, a first polymer) and a silicon-containing polymer (a second polymer) which is different from the first polymer and which contains a silicon atom.

In one embodiment of the present invention, the fluoropolymer, which constitutes the surface treatment agent, contains a silicon atom.

The fluoropolymer is a copolymer comprising a fluorine-containing monomer of the formula (I) and a silicon-containing monomer.

When the Rf group in the formula (I) is a fluoroalkyl group or a fluoroalkenyl group, Rf is preferably a perfluoroalkyl group or a perfluoroalkenyl group. The fluoroalkyl group or the fluoroalkenyl group has 1 to 21 carbon atoms, particularly 1 to 6 carbon atoms, for example, 1 to 4 carbon atoms. Examples of the fluoroalkyl group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, —$(CF_2)_7CF_3$, —$(CF_2)_5CF(CF_3)_2$, —$(CF_2)_6CF(CF_3)_2$, and —$(CF_2)_9CF_3$.

Y is an aliphatic group having 1 to 10 carbon atoms, an aromatic group or a cycloaliphatic group, each having 6 to 10 carbon atoms, a group —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group). The aliphatic group is preferably an alkylene group, particularly having 1 to 4 carbon atoms, for example, 1 or 2 carbon atoms. The aromatic group and the cycloaliphatic group may be substituted or unsubstituted.

The fluoroether group has at least one repeating unit (an oxyperfluoroalkylene group) selected from the group consisting of the repeating units: —$C_3F_6O$—, —$C_2F_4O$— and —$CF_2O$—. The —$C_3F_6O$— group is —$CF_2CF_2CF_2O$— or —$CF_2C(CF_3)FO$—. The —$C_2F_4O$— group is generally —$CF_2CF_2O$—. The total number of the oxyperfluoroalkylene repeating units is 1 to 200, for example, 1 to 100, and particularly 5 to 50. The fluoroether group has a terminal group which is directly bonded to the oxyperfluoroalkylene repeating unit. Examples of the terminal group include a hydrogen atom, a halogen atom (e.g., a fluorine atom), an alcohol group (e.g., $HOCH_2$—), an epoxy group (for example,

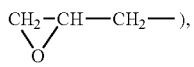), an amine group (e.g., $H_2N$—), a carboxylic acid group (e.g., HOOC—), an acid halide group (e.g., F(O=)C—) and a chloromethyl group ($ClH_2C$—). The fluoroether group may have a fluoroalkylene group having 1 to 10 carbon atoms, particularly a perfluoroalkylene group, in addition to the oxyperfluoroalkylene repeating unit and the terminal group. Examples of the fluoroalkylene group having 1 to 10 carbon atoms are —$CF_2$— and —$CF_2CF_2$—.

Examples of the fluoroether group (particularly, a perfluoroether group) which is an example of Rf include the followings:

F—$(CF_2CF_2CF_2O)_n$—$CF_2CF_2$— (n is a number of 1 to 200),

F—$(CF_2C(CF_3)FO)_n$—$CF_2CF_2$— (n is a number of 1 to 200),

F—$(CF_2C(CF_3)FO)_n$—$(CF_2O)_m$—$CF_2CF_2$— (the total of n and m is 1 to 200), and F—$(CF_2CF_2O)_n$—$(CF_2O)_m$—$CF_2CF_2$— (the total of n and m is 1 to 200).

Examples of the fluorine-containing monomer include the followings:

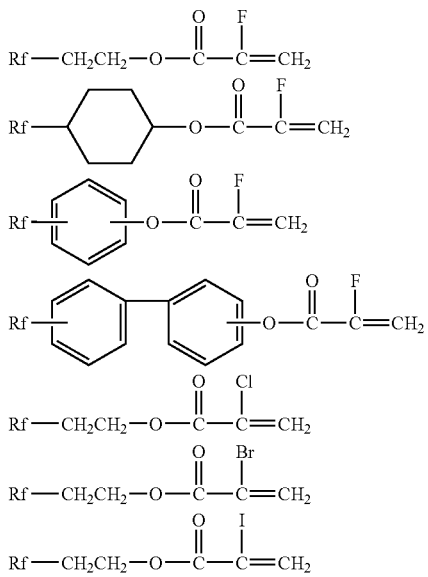
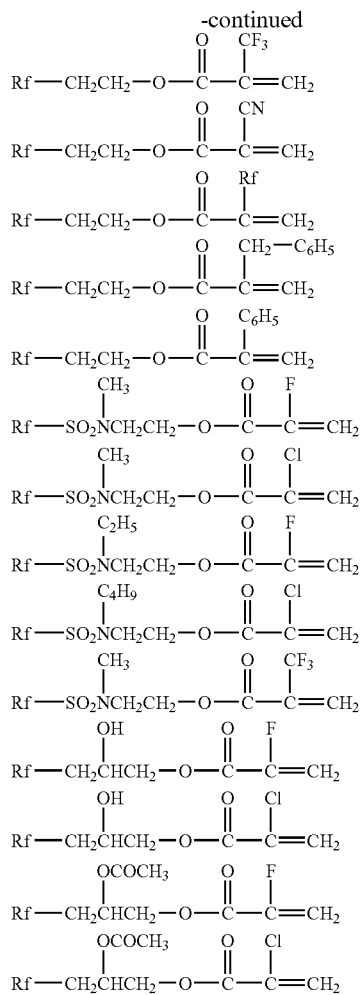

wherein Rf is a linear or branched fluoroalkyl or fluoroalkenyl group having 1 to 21 carbon atoms, or a fluoroether group having totally 1 to 200 repeating units selected from the group consisting of the repeating units: —$C_3F_6O$—, —$C_2F_4O$— and —$CF_2O$—.

The silicon-containing monomer is a monomer having at least one silicon atom and one carbon-carbon double bond.

The silicon-containing monomer may be, for example, a monomer of the formula:

$$A-\underset{\underset{R^1}{|}}{C}=CH_2 \qquad (II)$$

wherein A is a monovalent group having at least one silicon atom, and $R^1$ is a hydrogen atom or a methyl group.

The A group in the formula (II) may be a group represented by the formula:

Rsi-X— wherein Rsi is $R^{11}$—$(Si(R^{12})_2)_p$—, or $R^{11}$—$(Si(R^{12})_2$—$O)_p$— (in which the $R^{11}$ group is a hydrogen atom, a $C_1$-$C_8$ alkyl group or a $C_6$-$C_8$ aryl group; the $R^{12}$ groups may be the same or different, each representing a hydrogen atom, a $C_1-C_8$ hydrocarbon or halogenated hydrocarbon group optionally having a functional group; and p is a number of 1 to 100); and X is a direct bond, —(CH2)$_q$— (in which q is a number of 1 to 20), —(CH$_2$)$_r$—O— (in which r is a number of 0 to 20), or —(CH$_2$)$_s$—OC(=O)— (in which s is a number of 0 to 20).

As the functional group in the A group in the formula (II), there are mentioned a hydroxyl group, an epoxy group, a chloromethyl group, a blocked isocyanate, an amino group, and a carboxyl group.

Examples of the $C_1-C_8$ hydrocarbon or halogenated hydrocarbon group optionally having a functional group include the followings:

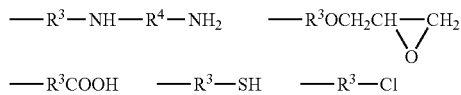

wherein each of $R^3$ and $R^4$ is a direct bond, an aliphatic group having 1 to 21 carbon atoms (e.g., an alkylene group), an aromatic group, or an aromatic aliphatic group (araliphatic group).

Examples of the silicon-containing monomer include vinyltrimethoxysilane, vinyltriethoxysilane, and the followings:

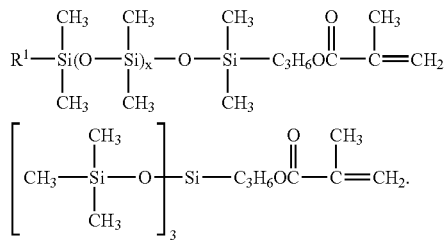

The fluoropolymer may contain a fluorine-free and silicon-free monomer, and optionally a crosslikable monomer, in addition to the fluorine-containing monomer and the silicon-containing monomer.

The fluorine-free and silicon-free monomer is preferably a monomer which contains no fluorine atom and no silicon atom, and has a carbon-carbon double bond. The fluorine-free and silicon-free monomer is preferably a vinyl monomer. The fluorine-free and silicon-free monomer is generally a compound having one carbon-carbon double bond. Preferable examples of the fluorine-free and silicon-free monomer include, but not limited to, ethylene, vinyl acetate, vinyl halide (e.g., vinyl chloride), vinylidene halide (e.g., vinylidene chloride), acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinylalkylether, isoprene, etc.

The fluorine-free and silicon-free monomer may be a (meth)acrylate having an alkyl group. This alkyl group may have 1 to 30 carbon atoms, for example, 6 to 30 carbon atoms, specifically 10 to 30 carbon atoms. For example, the fluorine-free and silicon-free monomer may be acrylates of the formula:

wherein $A^1$ is a hydrogen atom or a methyl group, and $A^2$ is an alkyl group of the formula: $C_nH_{2n+1}$(n=1 to 30).

The crosslinkable monomer is optionally present in the silicon-containing fluoropolymer. The crosslinkable monomer may be a fluorine-free compound having at least two reactive groups and/or carbon-carbon double bonds. The crosslinkable monomer may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate, an amino group, and a carboxyl group.

Examples of the crosslinkable monomer include, but not limited to, diacetone acrylamide, (meth)acrylamide, N-methylolacrylamide, hydroxymethyl (meth)acrylate, hydroxyetheyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, and glycidyl (meth)acrylate.

By copolymerizing the fluorine-free and silicon-free monomer and/or the crosslinkable monomer, it becomes possible to improve any of various properties such as water and oil repellency, soil resistance, and cleaning resistance and washing resistance for keeping these properties, solubility in a solvent, stiffness and feeling, as required.

In the silicon-containing fluoropolymer, the amount of the silicon-containing monomer may be 0.01 to 50 parts by weight, for example, 0.1 to 20 parts by weight; the amount of the fluorine-free and silicon-free monomer may be not larger than 100 parts by weight, for example, not larger than 50 parts by weight, specifically 0.1 to 50 parts by weight; and the amount of the crosslinkable monomer may be not larger than 50 parts by weight, for example, not larger than 20 parts by weight, specifically 0.1 to 15 parts by weight, based on 100 parts by weight of the fluorine-containing monomer.

In another embodiment of the present invention, the surface treatment agent comprises a fluoropolymer (i.e., a first polymer) and a different second polymer which is a silicon-containing polymer containing a silicon atom. The surface treatment agent comprises a mixture of the fluoropolymer and the silicon-containing polymer. The fluoropolymer in the mixture generally contains no silicon atom, but it may be a silicon-containing fluoropolymer, as described above. The surface treatment agent as the mixture is generally a mixture of a silicon-free fluoropolymer and a silicon-containing polymer.

The silicon-free fluoropolymer may comprise a fluorine-containing monomer, a fluorine-free and silicon-free monomer, and optionally, a crosslinkable monomer.

Examples of the fluorine-containing monomer and the fluorine-free and silicon-free monomer, and optionally, the crosslinkable monomer are the same ones as described above.

The silicon-free fluoropolymer may comprise 100 parts by weight of the fluorine-containing monomer, not larger than 100 parts by weight, for example not larger than 50 parts by weight, specifically 0.1 to 50 parts by weight of the fluorine-free and silicon-free monomer, and not larger than 50 parts by weight, for example, not larger than 20 parts by weight, specifically 0.1 to 15 parts by weight of the crosslinkable monomer.

The second polymer may have or may not have a fluorine atom. The silicon-containing polymer may be a fluorine-containing siloxane polymer or a fluorine-free siloxane polymer. Examples of the silicon-containing polymer include dimethylpolysiloxane, methylhydrogenpolysiloxane, amino-modified silicone, carboxyl-modified silicone and phenylmethylsilicone.

The siloxane polymer may be a compound of the formula:

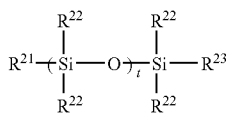
(III)

wherein each of the $R^{21}$ and $R^{23}$ groups is a hydrogen atom, a $C_1$-$C_8$ hydrocarbon group (e.g., a $C_1$-$C_8$ alkyl group and a $C_6$-$C_8$ aryl group) or a functional group-containing group; the $R^{22}$ groups may be the same or different, each representing a hydrogen atom, a $C_1$-$C_8$ hydrocarbon group, a $C_1$-$C_8$ halogenated hydrocarbon group, or a functional group-containing group; and t is a number of 1 to 200.

Examples of the functional group in the formula (III) include a hydroxyl group, an epoxy group, a chloromethyl group, blocked isocyanate, an amino group, and a carboxyl group.

Examples of the functional group-containing groups (that is, $R^{21}$, $R^{22}$ and $R^{23}$) in the formula (III) include the followings:

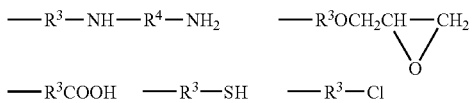

wherein each of the $R^3$ and $R^4$ groups is a direct bond, an aliphatic group having 1 to 21 carbon atoms (e.g., an alkylene group), an aromatic group, or an aromatic aliphatic group (araliphatic group).

Examples of the siloxane polymer include the followings:

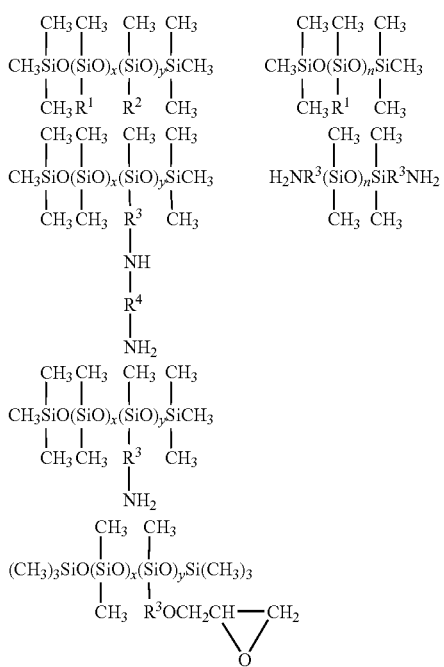

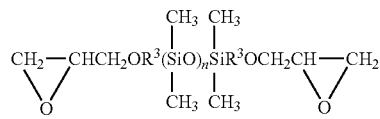

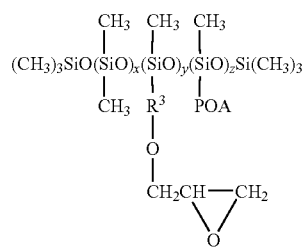

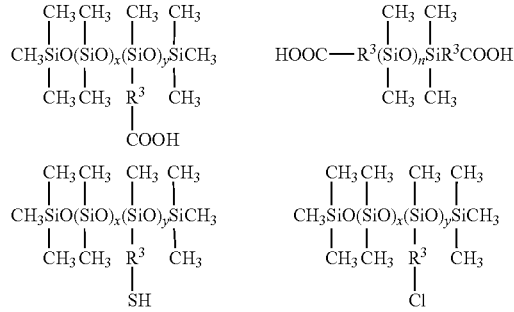

wherein each of the $R^1$ and $R^2$ groups is a hydrogen atom, a $C_1$-$C_8$ hydrocarbon group, a $C_1$-$C_8$ halogenated hydrocarbon group, or a functional group-containing group; each of the $R^3$ and $R^4$ groups is a direct bond, an aliphatic group having 1 to 21 carbon atoms (e.g., an alkylene group), an aromatic group or an aralipahtic group; POA is polyalkylene oxide (in which the alkylene has 2 to 5 carbon atoms, and the number of alkylene oxides is 2 to 100); and each of n, x, y and z is a number of 1 to 300.

The silicon-containing polymer may have a fluorine atom. The silicon-containing polymer which has a fluorine atom can be prepared, for example, by addition-reaction (particularly a Michael addition reaction) between the above siloxane polymer (a silicon-containing polymer which contains no fluorine atom) and a fluorine-containing monomer as follows:

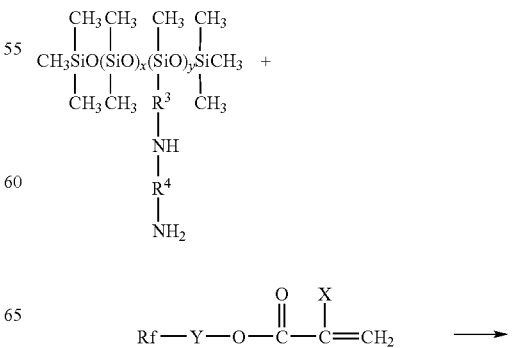

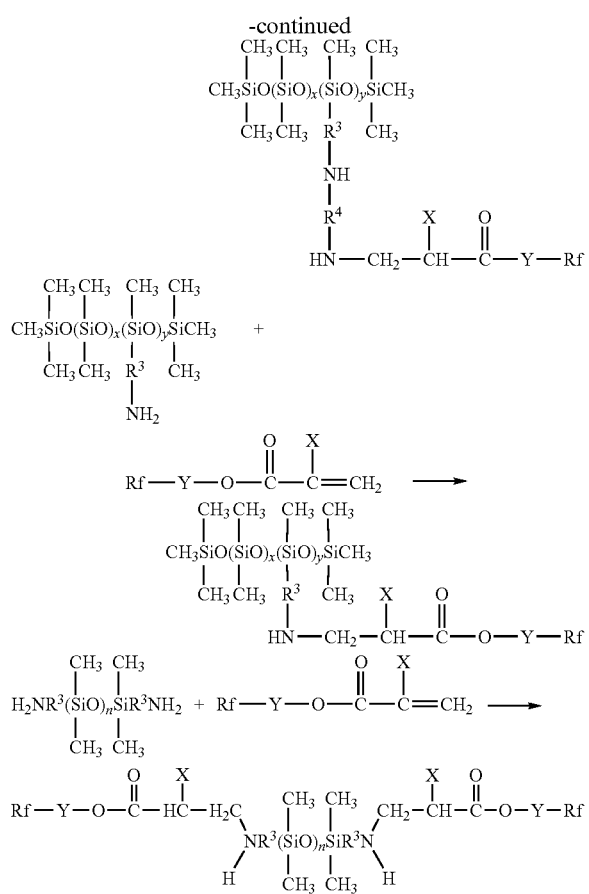

wherein X, Y, R³, R⁴, Rf, x and y are as defined above.

The silicon-containing polymer which has a fluorine atom may be any of the following compounds, in which the above silicon-containing polymer having a fluorine atom is further reacted with a fluorine-containing monomer:

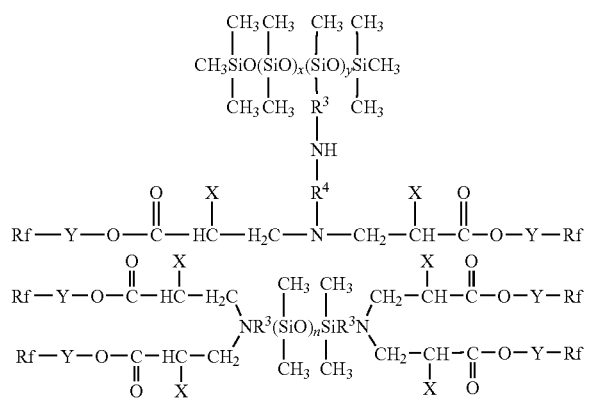

wherein X, Y, R³, R⁴, Rf, x and y are as defined above.

In the surface treatment agent which is a mixture of the fluoropolymer and the silicon-containing polymer, the amount of the silicon-containing polymer may be from 0.01 to 100 parts by weight, for example, from 0.01 to 50 parts by weight, based on 100 parts by weight of the fluoropolymer.

The fluoropolymer can be prepared as follows.

In case of solution polymerization, the monomers are dissolved in an organic solvent in the presence of a polymerization initiator, and the solution is subjected to nitrogen replacement, and then is agitated under heating at a temperature of 30 to 120° C. for 1 to 10 hours. As the polymerization initiator, for example, azobisisobutylonitrile, benzoyl peroxide, di-t-butyl peroxide, lauryl peroxide, cumene hydroperoxide, t-butylperoxy pivalate, or diisopropylperoxy dicarbonate is used. The polymerization initiator is used in an amount of 0.01 to 20 parts by weight, for example, 0.01 to 10 parts by weight, per 100 parts by weight of the monomers.

The organic solvent dissolves the monomers while being inactive with them, and examples thereof include acetone, chloroform, HCHC225, isopropylalcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, and trichlorotrifluoroethane. The organic solvent is used in an amount of 50 to 2,000 parts by weight, for example, 50 to 1,000 parts by weight, per total 100 parts by weight of the monomers.

In case of emulsion polymerization, the monomers are emulsified in water in the presence of a polymerization initiator and an emulsifier, and the emulsion is subjected to nitrogen replacement and is then copolymerized under stirring at a temperature of 50 to 80° C. for 1 to 10 hours. As the polymerization initiator, there is used a water soluble polymerization initiator such as benzoyl peroxide, lauroyl peroxide, t-butyl perbenzoate, 1-hydroxycyclohexylhydro peroxide, 3-carboxypropionyl peroxide, acetyl peroxide, azobisisobutylamidine-dihydrochloride, azobisisobutylonitrile, sodium peroxide, potassium persulfate, or ammonium persulfate; or an oil soluble polymerization initiator such as azobisisobutylonitrile, benzoyl peroxide, di-t-butyl peroxide, lauryl peroxide, cumene hydroperoxide, t-butylperoxy pivalate, or diisopropylperoxy carbnate. The polymerization initiator is used in an amount of 0.01 to 10 parts by weight per 100 parts by weight of the monomers.

Preferably, to obtain an aqueous dispersion of the copolymer which can be stably left to stand alone, an emulsifying machine capable of applying a powerful shearing energy, such as a high pressure homogenizer or an ultrasonic homogenizer is used to pulverize the monomers in water, and the particles of the monomers are polymerized in the presence of an oil soluble polymerization initiator. As the emulsifier, an emulsifier of any type such as anionic type, cationic type or nonionic type can be used in an amount of 0.5 to 20 parts by weight per 100 parts by weight of the monomers. Preferably used is anionic and/or nonionic and/or cationic emulsifier(s). When the monomers are not completely compatible with each other, it is preferable to add an agent for imparting sufficient compatibility to these monomers, for example, a water soluble organic solvent or a monomer having a low molecular weight. By the addition of the compatibilizing agent, the emulsification and copolymerization of the monomers can be facilitated.

Examples of the water soluble organic solvent include acetone, methyl ethyl ketone, ethyl acetate, propylene glycol, dipropyleneglycol monomethylether, dipropylene glycol, tripropylene glycol, and ethanol. The water soluble organic solvent may be used in an amount of 1 to 50 parts by weight, for example, 10 to 40 parts by weight, per 100 parts by weight of water. Examples of the monomer having a low molecular weight include methyl methacrylate, glycidyl methacrylate, and 2,2,2-trifluoroethyl methacrylate. Such monomer may be used in an amount of 1 to 50 parts by weight, for example, 10 to 40 parts by weight, per total 100 parts by weight of the monomers.

Preferably, the surface treatment agent of the present invention is in the form of a solution, an emulsion or an aerosol. The surface treatment agent comprises a fluoropolymer and a medium (e.g., a liquid medium such as an organic solvent and water). The concentration of the fluoropolymer in the surface treatment agent is, for example, 0.01 to 50% by weight.

The surface treatment agent of the present invention can be applied to a substrate by any of the known methods. In general, the surface treatment agent is dispersed in or diluted with an organic solvent or water, and is applied to the surface of a substrate by a known method such as dip coating, spray coating or foam coating, and then dried. If needed, an appropriate crosslinking agent is used in combination so as to perform the curing. Also, another surface treatment agent (e.g., a water repellent agent or an oil repellent agent), or an insecticide, a softening agent, an antibacterial agent, a flame retardant, an antistatic agent, a paint-fixing agent, an anticrease agent or the like may be used in combination with the surface treatment agent of the present invention. In case of dip coating, the concentration of the fluoropolymer in a treating liquid may be 0.05 to 10% by weight. In case of spray coating, the concentration of the fluoropolymer in a treating liquid may be 0.1 to 5% by weight. A stain blocking agent may be used in combination. In the case of useng the stain blocking agent, it is preferable to use an anionic or nonionic emulsifier.

Substrates to be treated with the surface treatment agent of the present invention (e.g., a water- and oil repellent agent) include textiles, stone, filters (e.g., a electrostatic filter), dust masks, glass, paper, wood, leather, fur, asbestos, bricks, cement, metals and oxides, ceramics, plastics, coatings and plasters. The textile may be a carpet. The textile have various examples. Examples of the textiles include products of animal/vegetable natural fibers such as cotton, hemp, wool and silk, products of synthetic fibers such as polyamide, polyester, polyvinylalcohol, polyacrylonitrile, polyvinyl chloride and polypropylene, products of semisynthetic fibers such as rayon and acetate, products of inorganic fibers such as glass fibers, carbon fibers and asbestos fibers, and products of mixed fibers of these fibers.

The treatment agent of the present invention has a high resistance against a detergent solution or brushing (mechanical force), and therefore can be suitably used on carpets made of nylon or polypropylene.

The textiles may be in the form of fibers, fabric or the like. When a carpet is treated with the surface treatment agent of the present invention, the carpet may be formed after fibers or yarns are treated with the surface treatment agent, or a formed carpet may be treated with the surface treatment agent.

BEST MODES FOR CARRYING OUT THE INVENTION

Example of the present invention will be described in detail, however, these Examples should not be construed as limiting the scope of the present invention in any way.

Shower Water Repellency Test

The shower water repellency was expressed by water repellency No. (as shown in the below-described Table 1) conducted according to JIS-L-1092.

TABLE 1

| Water repellency No. | State |
|---|---|
| 5 | No wet or adhesion on surface |
| 4 | Slight wet or adhesion on surface |
| 3 | Partial wet on surface |
| 2 | Wet on whole surface |
| 1 | Wet on front and back whole surfaces |

Water-Repellency Test

A treated fabric is stored in a thermo-hygrostat having a temperature of 21° C. and a humidity of 65% for at least 4 hours. A test liquid (isopropyl alcohol (IPA), water, and a mixture thereof, as shown in Table 2) which has been also stored at 21° C. is used. The test is conducted in an air-conditioned room having a temperature of 21° C. and a humidity of 65%. A droplet of the test liquid in an amount of 0.05 mL is softly dropped by a micropipette on the fabric. If the droplet remains on the fabric after standing for 30 seconds, the test liquid passes the test. The water-repellency is expressed by a point corresponding to a maximum content (% by volume) of isopropyl alcohol (IPA) in the test liquid which passes the test. The water-repellency is evaluated as twelve levels which are Fail, 0, 1, 2, 3, 4, 5, 6, 7, 8, 9 and 10 in order of a poor level to an excellent level.

TABLE 2

| | Water-repellency test liquid (% by volume) | |
|---|---|---|
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Oil-Repellency Test

A treated fabric is stored in a thermo-hygrostat having a temperature of 21° C. and a humidity of 65% for at least 4 hours. A test liquid (shown in Table 3) which has been also stored at 21° C. is used. The test is conducted in an air-conditioned room having a temperature of 21° C. and a humidity of 65%. A droplet of the test liquid in an amount of 0.05 mL is softly dropped by a micropipette on the fabric. If the droplet remains on the fabric after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a poor level to an excellent level.

TABLE 3

| Point | Test liquid | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

Feeling Test

A treated PET cloth was felt by one's finger to find a difference in feeling, which was evaluated based on the following criteria.

Good: The same as an untreated cloth, or softer

No good: Stiffer than an untreated cloth

Synthesis of Monomers

PREPARATION EXAMPLE 1

9F-Alc/αF Monomer

A 200 ml four-necked flask was charged with 2-fluoroacrylic acid (19 g, 0.21 mol) and triethylamine (22.94 g, 0.23 mol), and the flask was purged by a nitrogen gas for 30 minutes under stirring. After that, the flask was cooled on ice until the internal temperature thereof reached 5° C. Then, 2-(perfluorobutyl)ethanol (9F-Alc) (54.52 g, 0.21 mol) was added dropwise to the content in the flask over 4.5 hours so that the upper limit of the internal temperatures of the flask was 15° C. under a stream of a nitrogen gas. After the completion of the addition, the flask was continuously cooled on ice for 30 minutes so as to adjust the internal temperature at 5° C. until the exothermic reaction had been terminated. After that, the internal temperature was increased to a room temperature, and the reaction solution was aged for one hour while confirming that the internal temperature was not being increased. The reaction liquid was filtered and left to stand alone overnight. Then, the reaction liquid was neutralized with an aqueous 10% NaHCO₃ solution, and then was washed three times with water. Thus, a brownish liquid (54.00 g) (yield: 77.82%) was obtained as a product [i.e., 2-(perfluorobutyl)ethyl 2-fluoroacrylate] (9F-Alc/αF monomer) which was identified by $^1$H-NMR, $^{19}$F-NMR and $^{13}$C-NMR.

Preparation of Polymer

PREPARATION EXAMPLE 2

Copolymer of 9F-Alc/αF, StA and Reactive Silicone (7:2.5:0.5 in Weight Ratio)

A 200 ml four-necked flask was charged with the 9F-Alc/αF monomer (15.00 g, 0.045 mol) synthesized in Preparation Example 1, stearyl acrylate (5.34 g, 0.016 mol) and a reactive silicone of the formula:

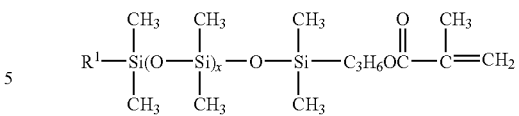

wherein $R^1$ is a hydrogen atom or an organic group, and x is such a number that this compound has an number-average molecular weight of about 1,000 (SAILAPLANE FM-0711 manufactured by CHISSO CORPORATION) (1.07 g, 0.0002 mol) in the weight ratio 7:2.5:0.5, together with tetrachlorohexafluorobutane (S-316 manufactured by DAIKIN INDUSTRIES, LTD.) (173.32 g, 0.57 mol). Then, the solution in the flask was bubbled with a nitrogen gas for 30 minutes, and the gas phase was replaced with nitrogen for 30 minutes. The internal temperature was increased to 60° C., and a solution of perbutyl PV (2.30 g, 0.013 mol) in trichloroethane (11.22 g) was added, and the mixture was reacted for 6 hours. The reaction step was monitored by gas chromatograpy, and the disappearance of the peaks of the 9F-Alc/αF monomer and the stearyl acrylate was regarded as the completion of the reaction. After the completion of the reaction, methanol was added to a solution of the resultant polymer to give a white precipitate having a very high viscosity. The supernatant was removed by decantation, and the solvent was removed from the precipitate using an evaporator, to obtain a cream-colored rubber-like compound (19.25 g) (polymer yield: 89.91%), which was identified by $^1$H-NMR, $^{19}$F-NMR and $^{13}$C-NMR. The weight ratio of the monomers in the polymer was substantially the same as that of the charged monomers.

PREPARATION EXAMPLE 3

Copolymer of 9F-Alc/αF, StA and Reactive Silicone (7:3:1 in Weight Ratio)

A 200 ml four-necked flask was charged with the 9F-Alc/αF monomer (14.00 g, 0.042 mol) synthesized in Preparation Example 1, stearyl acrylate (4.00 g, 0.012 mol) and a reactive silicone (SAILAPLANE FM-0711 manufactured by CHISSO CORPORATION) (2.00 g, 0.0004 mol) in the weight ratio 7:3:1, together with tetrachlorohexafluorobutane (S-316 manufactured by DAIKIN INDUSTRIES, LTD.) (161.91 g). Then, the solution in the flask was bubbled with a nitrogen gas for 30 minutes, and the gas phase was replaced with nitrogen for 30 minutes. The internal temperature was increased to 60° C., and a solution of perbutyl PV (2.15 g, 0.012 mol) in trichloroethane (10.48 g) was added, and the mixture was reacted for 6 hours. The reaction step was monitored by gas chromatograpy, and the disappearance of the peaks of the 9F-Alc/αF monomer and the stearyl acrylate was regarded as the completion of the reaction. After the completion of the reaction, methanol was added to a solution of the resultant polymer to give a white precipitate having a very high viscosity. The supernatant was removed by decantation, and the solvent was removed from the precipitate using an evaporator, to obtain a cream-colored rubber-like compound (16.18 g) (polymer yield: 80.90%), which was identified by $^1$H-NMR, $^{19}$F-NMR and $^{13}$C-NMR. The weight ratio of the monomers in the polymer was substantially the same as that of the charged monomers.

COMPARATIVE PREPARATION EXAMPLE 1

Copolymer of 9F-Alc/Me and StA

A 100 ml four-necked flask was charged with 2-(perfluorobutyl)ethyl metahcrylate (9F-Alc/Me) (M-1420 manufactured by Daikin Chemicals Sales Co., Ltd.) (7.00 g, 0.021 mol), stearyl acrylate (3.00 g, 0.0093 mol) and tetrachlorohexafluorobutane (S-316 manufactured by DAIKIN INDUSTRIES, LTD.) (56.47 g). Then, the solution in the flask was bubbled with a nitrogen gas for 30 minutes, and the gas phase was replaced with nitrogen for 30 minutes. The internal temperature was increased to 60° C., and a solution of perbutyl PV (0.75 g, 0.0043 mol) in trichloroethane (3.67 g, 0.027 mol) was added, and the mixture was reacted for 5.5 hours. The reaction step was monitored by gas chromatograpy, and the disappearance of the peaks of the 2-(perfluorobutyl)ethyl metahcrylate monomer and the stearyl acrylate monomer was regarded as the completion of the reaction. After the completion of the reaction, methanol was added to a solution of the resultant polymer to give a white precipitate having a very high viscosity. The supernatant was removed by decantation, and the solvent was removed from the precipitate using an evaporator, to obtain a transparent liquid-like compound having a very high viscosity (9.63 g) (polymer yield: 96.3%), which was identified by elemental analysis (see Table 4), $^1$H-NMR, $^{19}$F-NMR and $^{13}$C-NMR. The weight ratio of the monomers in the polymer was substantially the same as that of the charged monomers.

COMPARATIVE PREPARATION EXAMPLE 2

Copolymer of 9F-Alc/αF and StA

A 100 ml four-necked flask was charged with the monomer shynthesized in Preparation Example 1 (9F-Alc/αF monomer) (7.00 g, 0.021 mol), stearyl acrylate (3.00 g, 0.0093 mol) and tetrachlorohexafluorobutane (S-316 manufactured by DAIKIN INDUSTRIES, LTD.) (56.47 g). Then, the solution in the flask was bubbled with a nitrogen gas for 30 minutes, and the gas phase was replaced with nitrogen for 30 minutes. The internal temperature was increased to 60° C., and a solution of perbutyl PV (0.75 g, 0.0043 mol) in trichloroethane (3.67 g) was added, and the mixture was reacted for 6 hours. The reaction step was monitored by gas chromatograpy, and the disappearance of the peaks of the 9F-Alc/αF monomer and the stearyl acrylate monomer was regarded as the completion of the reaction. After the completion of the reaction, methanol was added to a solution of the resultant polymer to give a cream-colored precipitate. The precipitate was filtered under reduced pressure and dried with a vacuum desiccator to obtain a cream-colored rubber-like compound (7.12 g) (polymer yield: 71.2%), which was identified by elemental analysis (see Table 4), $^1$H-NMR, $^{19}$F-NMR and $^{13}$C-NMR. The weight ratio of the monomers in the polymer was substantially the same as that of the charged monomers.

TABLE 4

|   | Comparative Example 1 | | Comparative Example 2 | |
|---|---|---|---|---|
|   | Found value | Calculated value | Found value | Calculated value |
| F | 35.69% | 36.05% | 37.72% | 39.58% |
| C | 42.64% | 48.63% | 45.42% | 45.83% |
| H | 4.64% | 5.60% | 4.96% | 4.95% |
| N | 0.00% | 0.00% | 0.00% | 0.00% |

EXAMPLE 1

The polymer (6 g) obtained in Preparation Example 2 was dissolved in HCFC 225 (600 g). Three nylon test cloths (510 mm×205 mm) were immersed in this solution (150 g) (for about 5 minutes), and then, the solvent was removed with a centrifugal dehydrator (at 500 rpm for 20 seconds). The same operation was conducted on three PET test cloths (510 mm×205 mm), three test cloths of mixed fibers of PET and cotton (510 mm×205 mm) and three cotton test cloths (510 mm×205 mm). After that, the respective test cloths were dried at 28° C. overnight.

Next, each one of the nylon test cloths, the PET test cloths, the test cloths of the mixed fibers of PET and cotton, and the cotton test cloths was treated at 80° C., using a pin tenter (for 3 minutes), and then, each of the test cloths was cut into halves (255 mm×205 mm). One of the halves was used in a shower water repellency test and the other half was used in a water repellency test and an oil repellency test.

Next, each one of the nylon test cloths, the PET test cloths, the test cloths of the mixed fibers of PET and cotton, and the cotton test cloths was treated at 150° C., using a pin tenter (for 3 minutes), and then, each of the test cloths was cut into halves (255 mm×205 mm) One of the halves was used in a shower water repellency test and the other half was used in a water repellency test and an oil repellency test.

The remainders of the nylon test cloths, the PET test cloths, the test cloths of the mixed fibers of PET and cotton, and the cotton test cloths were not treated by heating, and each of the test cloths was cut into halves (255 mm×205 mm). One of the halves was used in a shower water repellency test and the other half was used in a water repellency test and an oil repellency test. The results are shown in Table 5.

EXAMPLE 2

Test cloths were treated in the same manner as in Example 1, using a solution of the polymer obtained in Preparation Example 3, and then, shower water repellency tests, water repellency tests and oil repellency tests were conducted on the test cloths.

The results of the tests are shown in Table 5.

EXAMPLE 3

The polymer (5.7 g) obtained in Preparation Example 1 and an amino-modified silicone (SF8417 manufactured by Dow Corning Toray Co., Ltd.) (0.3 g) were dissolved in HCFC 225 (600 g). Test cloths were treated in the same manner as in Example 1, using this solution. Then, shower water repellency tests, water repellency tests and oil repellency tests were conducted on the test cloths.

The results of the tests are shown in Table 5.

COMPARATIVE EXAMPLE 1

Test cloths were treated in the same manner as in Example 1, using the polymer obtained in Comparative Preparation Example 1, and then, shower water repellency tests, water repellency tests and oil repellency tests were conducted on the test cloths.

The results of the tests are shown in Table 5.

COMPARATIVE EXAMPLE 2

Test cloths were treated in the same manner as in Example 1, using the polymer obtained in Comparative Preparation Example 2, and then, shower water repellency tests, water repellency tests and oil repellency tests were conducted on the test cloths.

The results of the tests are shown in Table 5.

TABLE 5

|  |  | Ex. 1 | | | Ex. 2 | | | Ex. 3 | | |
|---|---|---|---|---|---|---|---|---|---|---|
| Evaluation of properties | | Shower water repellency | Water repellency | Oil repellency | Shower water repellency | Water repellency | Oil repellency | Shower water repellency | Water repellency | Oil repellency |
| Nylon | RT | 70 | 6 | 5 | 50 | 5 | 5 | 80 | 6 | 2 |
|  | 80° C. | 70 | 8 | 5 | 70 | 7 | 6 | 80 | 6 | 2 |
|  | 150° C. | 80 | 10 | 7 | 90 | 10 | 7 | 80 | 5 | 2 |
| PET | RT | 50 | 5 | 3 | 50 | 3 | 2 | 80 | 3 | 2 |
|  | 80° C. | 70 | 5 | 1 | 70 | 7 | 2 | 80 | 6 | 2 |
|  | 150° C. | 70 | 9 | 6 | 70 | 8 | 2 | 80 | 6 | 3 |
| PET/cotton | RT | 50 | 5 | 4 | 50 | 7 | 3 | 70 | 4 | 2 |
|  | 80° C. | 50 | 8 | 5 | 50 | 8 | 3 | 70 | 4 | 2 |
|  | 150° C. | 50 | 8 | 5 | 70 | 8 | 4 | 70 | 5 | 2 |
| Cotton | RT | 0 | 9 | 3 | 0 | 9 | 5 | 50 | 4 | 2 |
|  | 80° C. | 0 | 9 | 5 | 50 | 9 | 5 | 50 | 4 | 3 |
|  | 150° C. | 50 | 9 | 2 | 50 | 9 | 4 | 50 | 4 | 3 |
| Feeling | | Good | | | Good | | | Good | | |

|  |  | C. Ex. 1 | | | C. Ex. 2 | | |
|---|---|---|---|---|---|---|---|
| Evaluation of properties | | Shower water repellency | Water repellency | Oil repellency | Shower water repellency | Water repellency | Oil repellency |
| Nylon | RT | 50 | 7 | 3 | 70 | 8 | 6 |
|  | 80° C. | 80 | 9 | 3 | 80 | 9 | 6 |
|  | 150° C. | 80 | 8 | 4 | 80 | 9 | 6 |
| PET | RT | 70 | 5 | 2 | 70 | 6 | 3 |
|  | 80° C. | 70 | 5 | 4 | 70 | 6 | 4 |
|  | 150° C. | 80 | 8 | 4 | 80 | 6 | 4 |
| PET/cotton | RT | 0 | 5 | 3 | 50 | 8 | 4 |
|  | 80° C. | 50 | 5 | 3 | 70 | 9 | 4 |
|  | 150° C. | 70 | 7 | 4 | 70 | 9 | 5 |
| Cotton | RT | 0 | 2 | 3 | 50 | 9 | 4 |
|  | 80° C. | 0 | 2 | 3 | 50 | 9 | 4 |
|  | 150° C. | 50 | 7 | 4 | 50 | 9 | 4 |
| Feeling | | No good | | | No good | | |

The invention claimed is:

1. A surface treatment agent comprising a fluoropolymer which has repeating units derived from a fluorine-containing monomer of the formula:

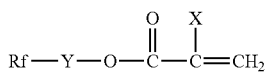

$$Rf-Y-O-\underset{\underset{O}{\|}}{C}-\underset{\underset{X}{|}}{C}=CH_2 \quad (I)$$

wherein X is a fluorine atom, a chlorine atom, a bromine atom, an iodine atom, a $CFX^1X^2$ group (in which $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group;

Y is an aliphatic group having 1 to 10 carbon atoms, an aromatic or cycloaliphatic group having 6 to 10 carbon atoms, a —$CH_2CH_2N(R^1)SO_2$— group (in which $R^1$ is an alkyl group having 1 to 4 carbon atoms) or a —$CH_2CH(OY^1)CH_2$— group (in which $Y^1$ is a hydrogen atom or an acetyl group); and Rf is a linear or branched perfluoroalkyl or perfluoroalkenyl group having 1 to 6 carbon atoms, or a fluoroether group having totally 1 to 200 repeating units selected from the group consisting of the repeating units: —$C_3F_6O$—, —$C_2F_4O$— and —$CF_2O$—, and wherein the fluoropolymer contains a silicon atom, and the silicon-containing fluoropolymer comprises repeating units derived from the fluorine-containing monomer of formula (I) and repeating units derived from a silicon-containing monomer represented by formula (II):

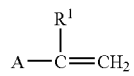

$$A-\underset{\underset{R^1}{|}}{C}=CH_2 \quad (II)$$

wherein A is a monovalent group having at least one silicon atom represented by the formula:

Rsi-X— wherein Rsi is

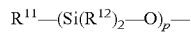

$$R^{11}-(Si(R^{12})_2-O)_p-$$

(in which the $R^{11}$ group is a hydrogen atom, or a $C_1$-$C_8$ alkyl group or a $C_6$-$C_8$ aryl group; each of the $R^{12}$ groups is the same or different, and is a hydrogen atom, a $C_1$-$C_8$ hydrocarbon or halogenated hydrocarbon group optionally having a functional group; and p is a number of 1 to 100);

X is a direct bond, —$(CH_2)_q$— (in which q is a number of 1 to 20), —$(CH_2)_r$—O— (in which r is a number of 0 to 20), or —$(CH_2)_s$—OC(=O)— (in which s is a number of 0 to 20); and $R^1$ is a hydrogen atom or a methyl group.

2. The surface treatment agent according to claim 1, wherein the silicon-containing fluoropolymer contains a fluorine-free and silicon-free monomer in addition to the fluorine-containing monomer and the silicon-containing monomer.

3. The surface treatment agent according to claim 2, wherein, in the silicon-containing fluoropolymer, the amount of the silicon-containing monomer is from 0.01 to 50 parts by weight, and the amount of the fluorine-free and silicon-free monomer is 50 or less parts by weight, based on 100 parts by weight of the fluorine-containing monomer.

4. The surface treatment agent according to claim 1, which is in the form of a solution, an emulsion or an aerosol.

5. A method for treating a substrate with the surface treatment agent according to claim 1.

6. A textile treated with the surface treatment agent according to claim 1.

7. A carpet treated with the surface treatment agent according to claim 1.

* * * * *